(12) United States Patent
Gudesen et al.

(10) Patent No.: US 11,686,284 B2
(45) Date of Patent: Jun. 27, 2023

(54) UNDERWATER ENERGY STORAGE SYSTEM

(71) Applicant: Hans Gude Gudesen, Lucerne (CH)

(72) Inventors: Hans Gude Gudesen, Lucerne (CH); Per-Erik Nordal, Asker (NO)

(73) Assignee: Hans Gude Gudesen, Lucerne (CH)

( * ) Notice: Subject to any disclaimer, the term of this patent is extended or adjusted under 35 U.S.C. 154(b) by 505 days.

(21) Appl. No.: 16/981,272

(22) PCT Filed: Mar. 21, 2019

(86) PCT No.: PCT/NO2019/050061
§ 371 (c)(1),
(2) Date: Sep. 15, 2020

(87) PCT Pub. No.: WO2019/182458
PCT Pub. Date: Sep. 26, 2019

(65) Prior Publication Data
US 2021/0071632 A1 Mar. 11, 2021

(30) Foreign Application Priority Data
Mar. 23, 2018 (NO) .................................. 20180412

(51) Int. Cl.
F03B 13/06 (2006.01)
H02J 15/00 (2006.01)

(52) U.S. Cl.
CPC ............ F03B 13/06 (2013.01); H02J 15/003 (2013.01); F05B 2220/32 (2013.01); F05B 2220/706 (2013.01); F05B 2260/422 (2020.08)

(58) Field of Classification Search
CPC ............ F05B 2220/32; F05B 2220/706; F05B 2260/442; F05B 2260/42; Y02E 60/16; Y02E 10/20
USPC .......................................................... 60/398
See application file for complete search history.

(56) References Cited

U.S. PATENT DOCUMENTS

| 5,964,369 A | 10/1999 | Greene et al. |
| 8,456,031 B1 | 6/2013 | Hull et al. |
| 8,664,786 B1 | 3/2014 | Hull et al. |

(Continued)

FOREIGN PATENT DOCUMENTS

| DE | 10 2011 115606 A1 | 3/2013 |
| DE | 10 2012 100981 A1 | 8/2013 |

(Continued)

OTHER PUBLICATIONS

English language Abstract of JP S62294723 A (Dec. 22, 1987).
(Continued)

Primary Examiner — Dustin T Nguyen
(74) Attorney, Agent, or Firm — Hershkovitz & Associates, PLLC; Abe Hershkovitz

(57) ABSTRACT

An underwater energy storage system comprising a container where energy is stored by transporting water between the container and a body of water, is disclosed. 5 The container comprises a water- and gas-tight membrane surrounding a container volume, where the container is rendered mainly incompressible by a fill material comprising densely packed, incompressible objects arranged in the container volume, the fill material forming a mainly incompressible aggregate.

21 Claims, 9 Drawing Sheets

(56) References Cited

U.S. PATENT DOCUMENTS

| | | | |
|---|---|---|---|
| 8,801,332 B2* | 8/2014 | Elazari-Volcani | F17C 1/007 405/210 |
| 9,470,365 B1 | 10/2016 | Atkinson et al. | |
| 9,617,970 B2 | 4/2017 | Luther et al. | |
| 9,797,366 B2 | 10/2017 | Luther et al. | |
| 2011/0070031 A1* | 3/2011 | Frazier | E02D 29/10 405/210 |
| 2011/0070032 A1 | 3/2011 | Frazier et al. | |
| 2011/0113769 A1 | 5/2011 | Olsen | |
| 2012/0305411 A1 | 12/2012 | Elazari-Volcani | |
| 2014/0334884 A1 | 11/2014 | Elazari-Volcani | |
| 2016/0207703 A1 | 7/2016 | Elazari-Volcani | |
| 2017/0233181 A1 | 8/2017 | Elazari-Volcani | |
| 2017/0259993 A1 | 9/2017 | Chitwood et al. | |

FOREIGN PATENT DOCUMENTS

| | | |
|---|---|---|
| JP | S62294723 A | 12/1987 |
| JP | S6312834 A | 1/1988 |
| JP | S63 253123 A | 10/1988 |
| JP | S63239319 A | 10/1988 |
| WO | WO 2010/003412 A2 | 1/2010 |
| WO | WO 2011/099014 A2 | 8/2011 |
| WO | WO 2013/119327 A1 | 8/2013 |
| WO | WO 2015/082543 A1 | 6/2015 |

OTHER PUBLICATIONS

English language Abstract of JP S63239319 A (Oct. 5, 1988).
English language Abstract of JP S6312834 A (Jan. 20, 1988).
Katherine Tweed, "Toronto Hydro Pilots World's First Offshore Compressed-Air Energy Storage Project," Nov. 25, 2015, p. 1-3, https://www.greentechmedia.com/articles/read/toronto-hydro-pilots-worlds-first-offshore-compressed-air-energy-storage#gs.mR9h9fs.
Jason Deign, "Fraunhofer Tests a New Underwater Energy Storage Concept," Aug. 29, 2016, p. 1-4, https://www.greentechmedia.com/articles/read/fraunhofer-races-hydrostor-for-underwater-storage#gs.SZ9rr6o.
Norwegian Search Report in related Norwegian Patent Application No. 20180412, dated Oct. 17, 2018.
English language Abstract of DE 10 2011 115606 A1 (Mar. 28, 2013).
English language Abstract of DE 10 2012 100981 A1 (Aug. 8, 2013).
English language Abstract of JP S63 253123 A (Oct. 20, 1988).
StEnSea (Stored Energy in the Sea) by Fraunhofer Institute, Hochtief Engineering GMBH (cf. "Storing energy at sea"), Apr. 12, 2017, retrieved from the Internet URL: http://forschung-energiespeicher.info/en/projektschau/gesamtliste/projekt-einzelansicht/95/Kugelpumpspeicher_unter_Wasser/.
Maxim De Jong, "Commercial Grid Scaling of Energy Bags for Underwater Compressed Air Energy Storage", 2014, retrieved from the Internet <URL:www thin-red-line com/140714 ThinRedLine 0SES2014.pdf>.
International Search Report (ISR) in International Application No. PCT/NO2019/050061, dated May 23, 2019.
Written Opinion of the ISA in International Application No. PCT/NO2019/050061, dated May 23, 2019.

* cited by examiner

UNDERWATER ENERGY STORAGE SYSTEM

TECHNICAL FIELD OF THE INVENTION

The present invention generally relates to underwater energy storage. More specifically it relates to a an underwater energy storage system comprising a container where energy is stored by transporting water between the container and a body of water, where the container comprises a water- and gas-tight flexible membrane surrounding a container volume, and the container is rendered mainly incompressible by a fill material comprising densely packed, incompressible objects arranged in the container volume

BACKGROUND FOR THE INVENTION

Pumped hydroelectric energy storage is well known and widely implemented in many countries in the world. Briefly, the concept is to store mechanical potential energy by pumping water from a reservoir at one level to a reservoir at a higher level, using surplus electrical power to drive a pump. When energy is needed at a later time, the energy is recovered by transferring water from the high level reservoir to the lower level reservoir through a turbine and electrical generator. This concept requires the presence of suitably localized reservoirs at high and low levels, and is therefore typically implemented in geographic regions with suitable topography, typically country with hills or mountains.

Recently, a new pumped hydroelectric energy storage concept has emerged where the upper and lower reservoirs are both located in a body of water, and where the upper reservoir level is essentially the surface of the body of water itself, while the lower level reservoir is created by evacuating a volume in a pressure-resistant container at some depth in the water. The principle is illustrated in FIG. 1: A hollow pressure resistant container (1), shown as a sphere in this example, is positioned near the bottom of a lake or the sea. The container is partly filled with water which can be transferred between the sphere and the surrounding body of water via a tube (2). The tube debouches near the bottom of the sphere volume and connects with a pump/generator unit (3). The upper volume of the container (1) is connected with the atmosphere above the body of water via a venting tube (4). In order to counteract buoyancy forces, the sphere is secured in place by ballast weights (5) or sea bottom anchoring.

Energy is stored by activating the pump/generator unit (3) in the pump mode, where the unit (6) supplies electrical energy via the power cable (7). This causes water to be transported out of the container (1) via the tube (2) against a net head of water corresponding to the height difference h between the water surface (11) inside the container and the free surface (12) of the body of water. As water is removed from the container, atmospheric air is sucked into the opening (10) of the venting tube and the air pressure inside the container remains close to that of the atmosphere above the body of water. Thus, removing a mass M of water from inside the container implies adding an amount of mechanical potential energy:

$$W = Mgh \qquad \text{Eq. 1.}$$

to the total hydraulic system shown in FIG. 1 (dimensions of the container (1) assumed much smaller than h). Inserting some numbers into Eq.1: M=1000 [kg.], h=1 [m.] yield W=2.73 $10^{-3}$ [kWh]. W scales linearly in mass M and depth h. Thus, the stored energy of 1000 [$m^3$] seawater (density 1023 [$kg/m^3$]) at depth 700 [m] is approximately 2 [MWh].

Energy is extracted by switching the pump/generator unit (3) to the power mode: Water from the surrounding body of water is allowed to enter the opening (13) at the end of the tube (2) and pass through a turbine inside the unit (3). The turbine drives an electrical generator which exports electric energy through the power cable (9) to the distribution unit (8) topside. Water passing through the turbine rushes into the container (1), causing the internal water level (11) to rise and forcing air out into the atmosphere via the tube (4).

The system illustrated in FIG. 1 has many attractive features:

It can in principle be deployed in any body of water with sufficient water depth.

The amount of stored energy can be scaled within wide limits by selecting the depth h and the container volume.

Charging and discharging does not pollute the environment.

It is based on mature technology.

It does not suffer charging losses during prolonged periods of energy storage.

It does not represent any large scale explosive or chemical hazards.

It can be removed or re-located.

These advantages have prompted a number of persons and institutions to suggest various technical implementations. A body of prior art literature has been generated in the form of reports, magazine articles and patents and patent applications, cf., e.g.: M. Bremicker et al.: "Unterwasser-Pumpspeicherkraftwerk", Offenlegungsschrift DE 10 2011 115 606 A1; H. Schmidt-Böcking et al.: "Pumped-storage power plant", U.S. Pat. Nos. 9,617,970 B2 and 9,797,366 B2; J. R. Hull, Jr. et al.: "Underwater pumped-hydro energy storage", U.S. Pat. Nos. 8,456,031 B1 and 8,664,786 B1.

However, there have until recently been few attempts at practical implementations or field testing, and so far there has not been reported any technical solutions that have a realistic potential to become economically viable. The reasons for this can ultimately be traced to the cost of building the technical infrastructure, more specifically the container: As is clear from Equation 1 above, the stored energy W scales with the mass M of water that can be shifted in a charging/discharging operation, and with the effective head of water h. Energy storage situations typically define magnitudes of W in the range megawatt-hours and more. This implies that the container ((1) in FIG. 1) must have a volumetric capacity of thousands of cubic meters and be localized at great depth, typically hundreds of meters under the surface.

The combination of large volume at near-atmospheric pressure inside the container and surrounding masses of water at a hydrostatic pressure that may reach 100 bars and more defines one of the basic challenges of constructing a viable underwater pumped hydroelectric system. Another major challenge is the buoyancy of the storage container: When fully charged, the container is filled with air while displacing several thousands of tons of water. Even when subtracting the weight of the container walls and all attached equipment, there typically remains a net buoyant force of several thousands of tons. In principle, this can be controlled by tethering to weights (cf. (5) in FIG. 1) or anchoring in the sea bottom, but the large forces involved must still be accommodated by proper attachment devices and force distribution structures in the container.

To illustrate the technical and economic issues involved, one may refer to a project which has been underway for several years, namely StEnSea (Stored Energy in the Sea), being developed by Fraunhofer Institute, Hochtief Engineering GMBH (cf. "Storing energy at sea". http://forschung-energiespeicher.info/en/projektschau/gesamtliste/projekt-einzelansicht/95/Kugelpumpspeicher_unter_Wasser/).

As illustrated in FIG. 2 (ref.: https://www.hochtief.com/hochtief_en/320.jhtml?id=17#) the container is a sphere, a shape chosen to maximize strength and minimize the amount of material required. The design envisages a sphere of internal diameter 30 meters and volume 12.000 m³, positioned at a depth of 700 meters. The sphere shall store 20 MWh and would be equipped with a 5 MW pump/turbine combination. To withstand the pressure, the wall is planned to be 2.7 meters thick and consist of concrete. A simple calculation shows that the buoyancy of the sphere shall be approximately 23.200 tons, while the wall contains approximately 9.000 m³ of concrete. With a density of 2.0 to 2.4 tons/m3, the weight of the concrete walls in the sphere shall be in the range 18.000 to 21.600 tons, which would compensate most, but not all of the buoyancy of the sphere. Thus, to ensure that the sphere and associated equipment shall rest stably on the sea bottom, there must be an added weight or tethering stress of several thousands of tons. It is to be expected that building and deploying such a system will be technically difficult and expensive. The sphere shall require precision molding of doubly curved surfaces with a high degree of symmetry, which must be performed on land or in a dry dock that can handle the considerable weight and size, followed by transport to the chosen location and deployment at great depth. Thus, the overall economic viability of the concept in competition with alternative storage technologies may be dubious.

Thus, there exists a need for containers for use in underwater pumped hydroelectric energy storage that can withstand high hydrostatic pressures, that have negative buoyancy, that are easy to manufacture, that are simple to deploy, and that provide overall low costs of construction and operation.

SUMMARY OF THE INVENTION

It is thus a general object of the present invention to provide an underwater energy storage system solving problems presented by solutions according to state of the art.

A main object of the invention is to provide an economically favorable system both when it comes to construction and operation.

A further main object is to provide a system which is easy to manufacture and simple to deploy.

Further objects are to provide a system that can withstand high hydrostatic pressure, and that have negative buoyancy.

A first aspect of the invention is an underwater energy storage system comprising a container adapted to be arranged in a body of water with a water surface, the container having a container volume comprising a void container volume adapted to be filled with gas and water to varying degrees at an internal pressure lower than the external pressure of the body of water surrounding the container, The system further comprises means for pumping water from the void container volume into the body of water for storing energy, and means for allowing water from the body of water flowing via a turbine into the void container volume for generating energy. The container comprises a water- and gas-tight membrane defining the container volume, where incompressible objects are densely packed throughout the container volume limiting deformation of the membrane by the external pressure, and the void container volume is formed by a communicating void interstitial volume between the incompressible objects.

Optionally, the incompressible objects comprise one or more of the following: gravel, rocks, shaped objects of concrete, polymer, composites or metal. The incompressible objects can have mainly spherical shape with diameters that differ by less than a factor 4:1.

Preferably, the net buoyancy of the energy storage system is negative.

The membrane optionally comprises at least one of the following materials: a geotextile, a metal net, a polymer net or mesh, a metal or polymer sheet, and a metal or polymer foil.

The membrane can comprise a single layer of the at least one material, and can further comprise multiple layers each comprising the at least one material.

The container can have an external shape selected among the following: sack, sphere, cylinder, and prism.

Optionally, the container comprises a stiff frame carrying the rest of the container, and the membrane has flexibility to transmit the external hydrostatic pressure to the incompressible objects inside. The stiff frame can be prismatic or cylindrical.

The container can comprise an outtake in the lower part, and the means for pumping can comprise a pump arranged for pumping water out of the void container volume via the outtake, for storing energy.

Optionally, the system comprises a turbine which is driving an electrical generator, and which is arranged at mainly the same depth as the container, and generating electrical energy by allowing water to enter the void container volume through the water turbine.

Optionally, the system comprises a gas transport tube communicating between upper part of the void container volume and devices for introducing compressed gas into the void container volume and for extracting energy from compressed gas in the void container volume, and further comprises an opening in lower part of the void container volume providing open access into the body of water surrounding the container.

The system further can comprise a valve controlling the flow of water between the lower part of the void container volume and the surrounding water.

The upper part of the void container volume can have a communicating tube to the air above the body of water.

The upper part of the container can be sealable such that the gas in the void container volume is sealed inside, and when the container is sealed, and gas in the void container volume can be evacuated to a pressure below 200 millibar with water either absent or at a level in the void container volume near that corresponding to a maximum of energy stored.

The gas in the void container volume can be air.

Optionally, the system comprises at least two containers with stiff frames, and the at least two containers are arranged in direct contact.

The container can be arranged in at least one of the following ways:
  i) completely submerged in the body of water;
  ii) extending from the water surface open to the air above, and down to the sea floor;
  iii) extending from the water surface open to the air above, and into the body of water where the air- and watertight membrane forms sidewalls and bottom; and iv) extending from a permanent structure, such that at least parts of the container is formed by a part of the permanent structure.

The system can comprise more than one container, where the containers are serviced by the same pump and/or turbine via a network of tubes.

SHORT DESCRIPTION OF THE FIGURES

Embodiments of the present invention will now be described, by way of example only, with reference to the following diagrams wherein.

Figure 3:
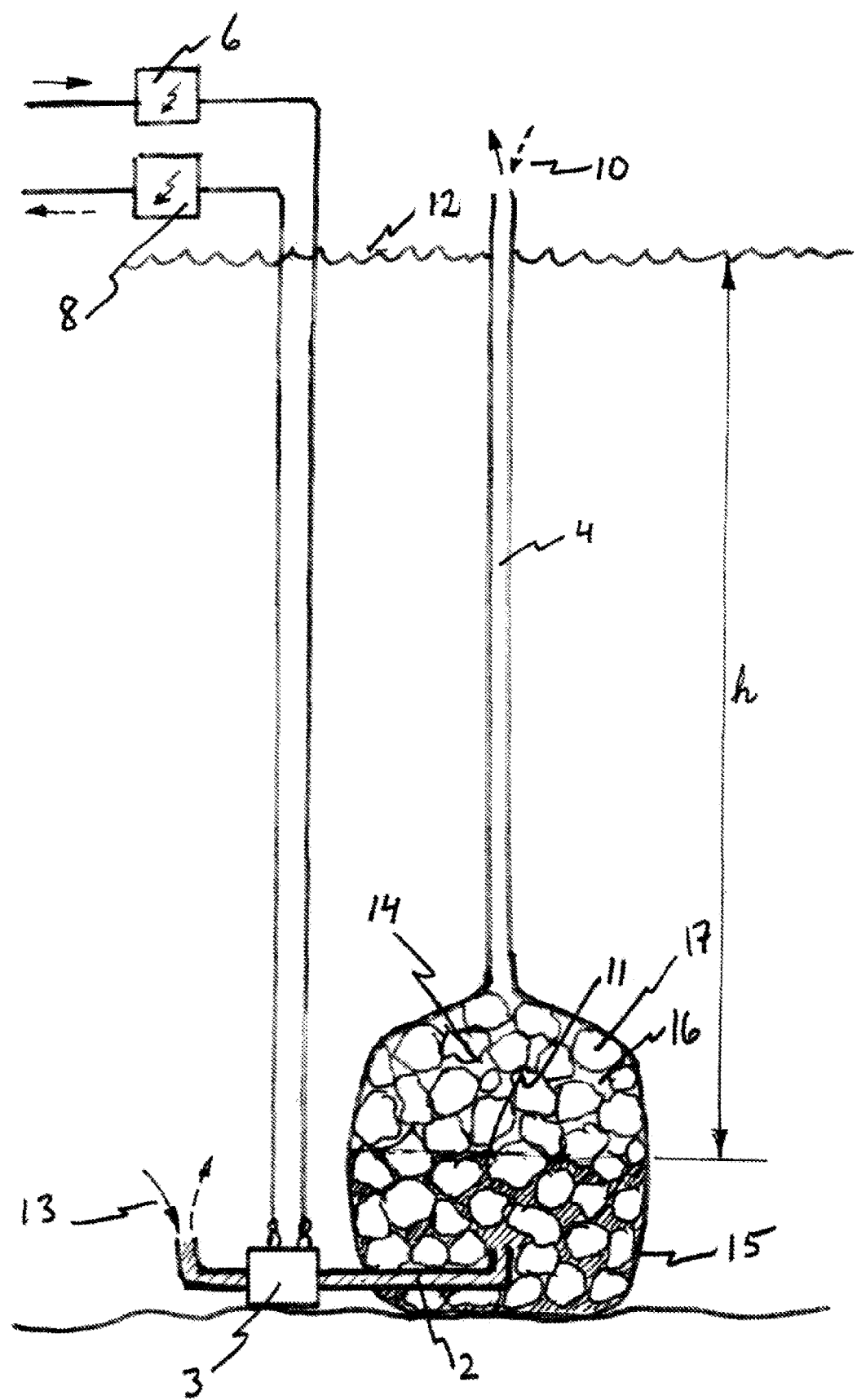

FIG. 3 discloses the basic principle of the present invention.

FIGS. 4a-e show examples of embodiments according to the present invention, with completely submerged energy storage containers.

Figure 5A:
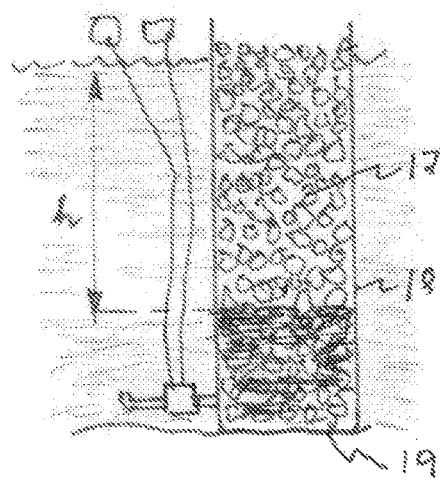

FIGS. 5a,b show examples of embodiments according to the present invention, with energy storage containers that are open to the atmosphere.

Figures 6A, 6B:
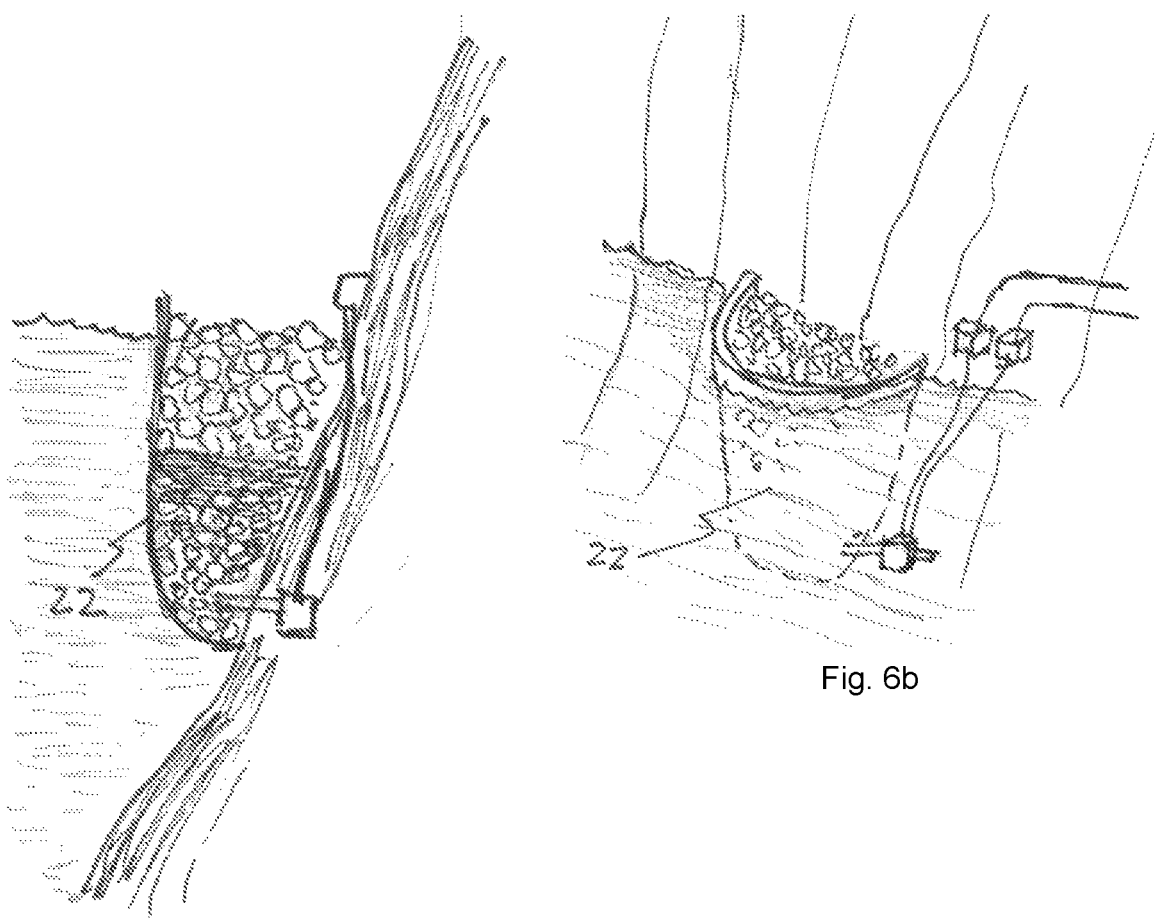

FIGS. 6a,b show an embodiment according to the present invention, where a mountainside forms one wall in the energy storage container.

Figure 7:
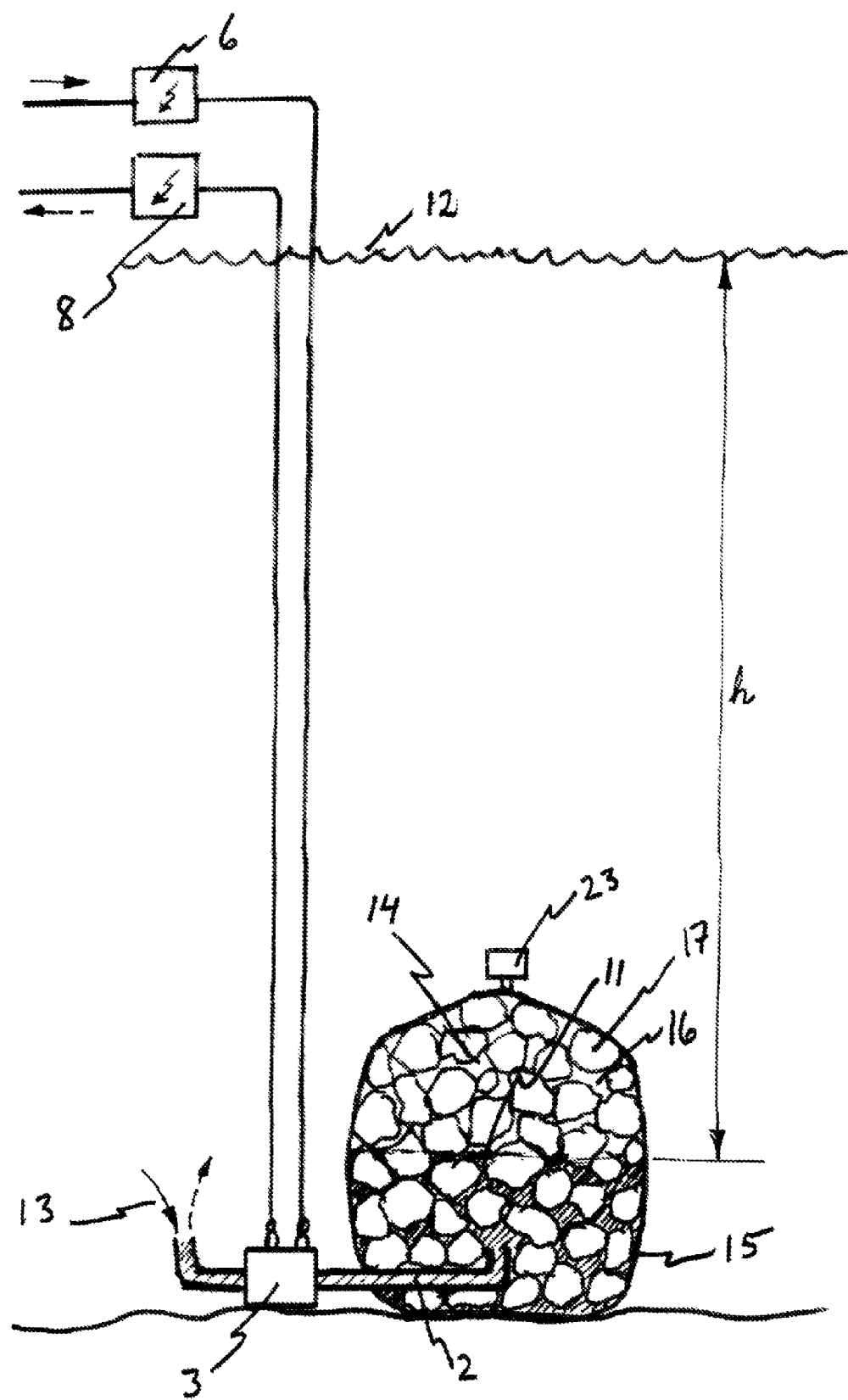

FIG. 7 shows an embodiment of the present invention where the energy storage container is sealed on top.

Figure 8:
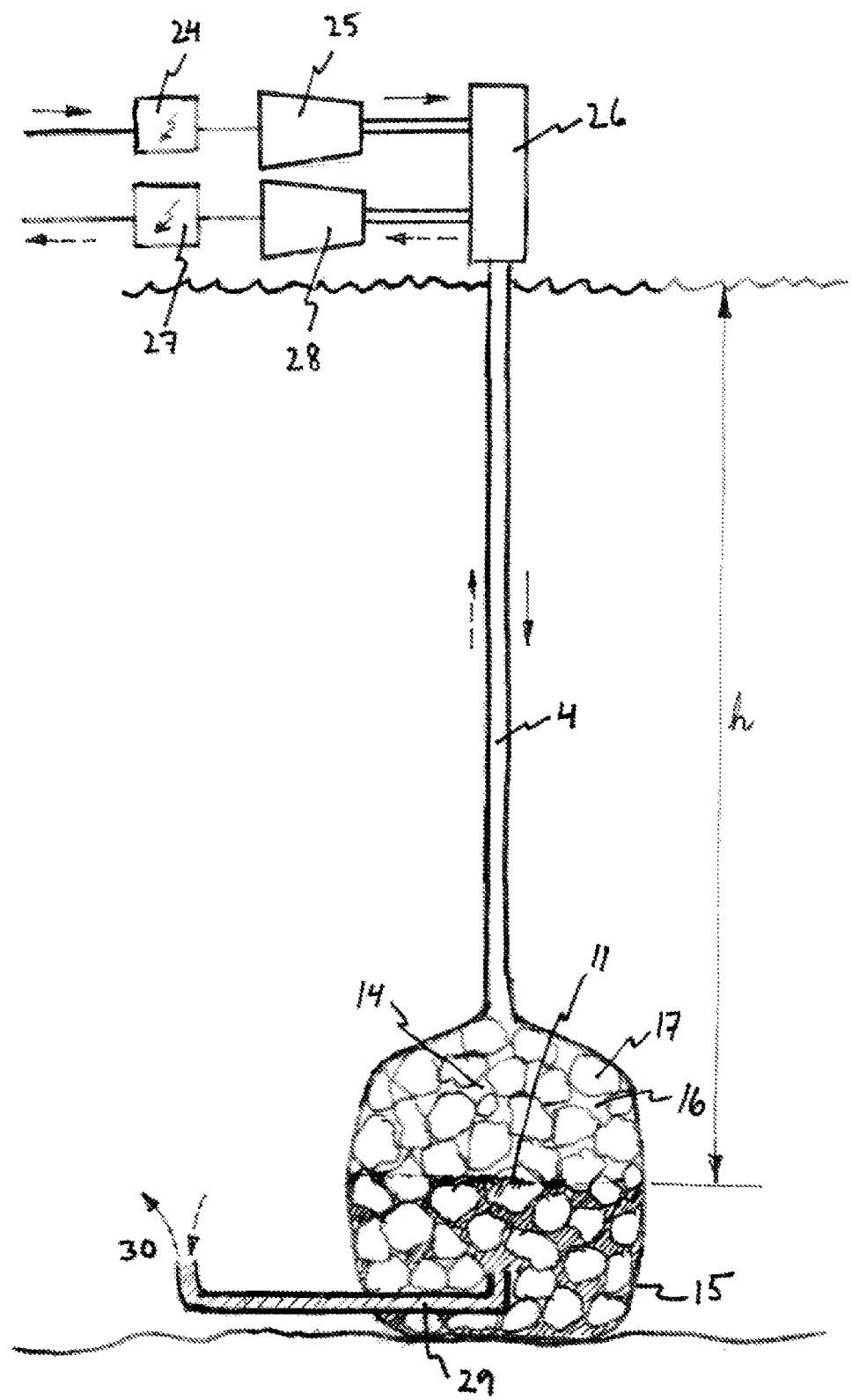

FIG. 8 shows an embodiment of the present invention where energy is stored as compressed air.

Figure 9:
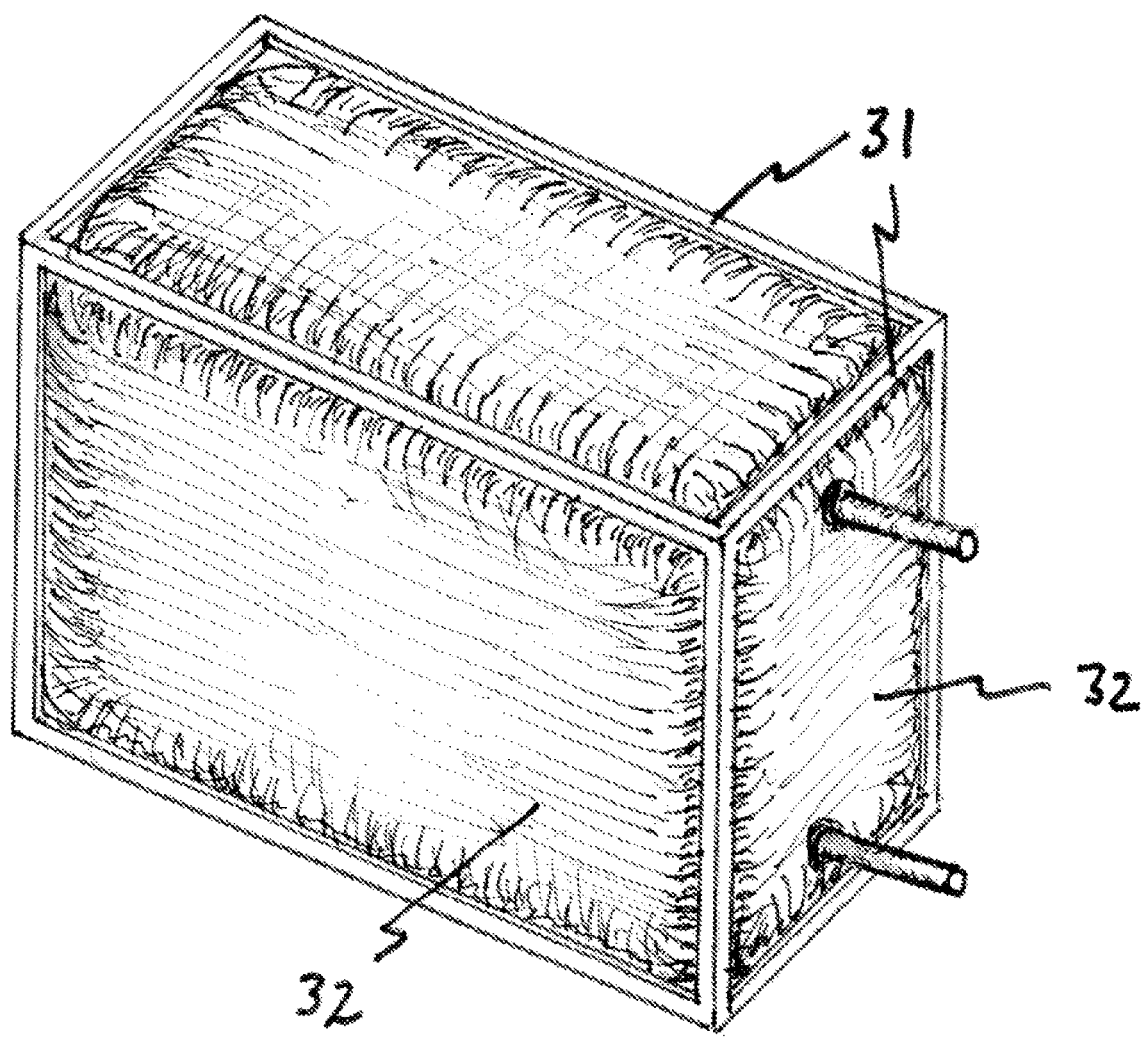

FIG. 9 shows an embodiment of the present invention where the energy storage container comprises a stiff frame carrying the rest of the energy storage container.

FIG. 10 shows an embodiment of the present invention where multiple containers are stacked together in 3 dimensions.

LIST OF REFERENCE NUMBERS IN FIGURES

Number Designation
1. Pressure resistant container
2. Tube
3. Pump/generator unit
4. Venting tube
5. Ballast weights
6. Electrical supply unit
7. Power cable
8. Electrical distribution unit
9. Power cable
10. Opening
11. Water surface inside container
12. Free surface of body of water
13. Opening to water outside container
14. Container
15. Watertight membrane
16. Void volume
17. Incompressible objects
18. Enveloping wall
19. Floor
20. Watertight wall
21. Filler material
22. Pocket shaped wall
23. Valve
24. Motor
25. Compressor
26. Control unit
27. Generator
28. Expander
29. Tube
30. Body of water
31. Structural frame
32. Membrane

DETAILED DESCRIPTION OF EMBODIMENTS OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Figure 1:
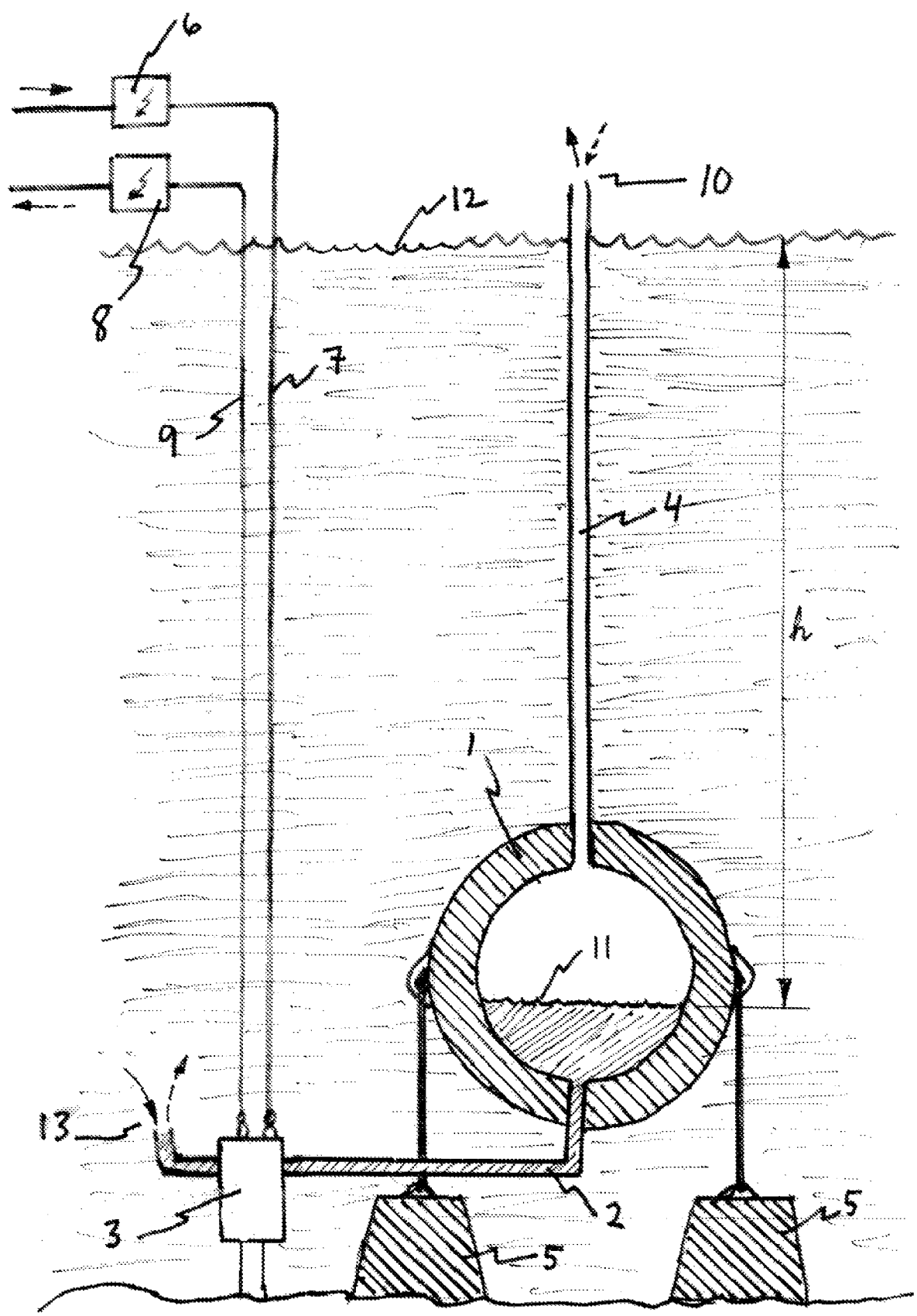
FIG. 1 shows a principle drawing of a prior art system for underwater pumped hydroelectric energy storage and power generation.

The present invention shall now be described with reference to the principle drawing shown in FIG. 3. As can be seen, the underwater pumped hydroelectric energy storage system is essentially similar to the prior art system shown in FIG. 1, but differs in one fundamental aspect: The pressure resistant container (14) is not a hard shell cavity. Rather, it is a volume enclosed by an air- and watertight membrane (15), filled with incompressible rocks or other objects (17) which are packed together inside. The void volume (16) between the objects now constitutes the available storage volume for water in the container. When the water is pumped out of the container, the hydrostatic pressure in the water outside acts on the membrane to push it inwards, but encounters an opposing force from the objects packed inside, which push against each other and communicate the force throughout the entire container volume. Following an initial accommodation process, the incompressible objects shall form an incompressible aggregate with a communicating void volume between the objects where water or air can flow. This void volume constitutes the available storage space, corresponding to the internal volume in prior art hard shell container concepts. The objects being incompressible is here meant to imply that they are made from materials with a low bulk compressibility, typically $\beta < 10^{-8}\text{-}10^{-9}$ $[m^2/N]$, and are physically shaped to yield low deformation when subjected to external forces.

Certain features of the present invention are of particular importance:

The container can resist high hydrostatic pressures and may be given virtually any shape. All that is required is a strong membrane and incompressible objects to fill it.

The container shall not need ballasting as long as the packed fill material has a density exceeding that of water.

The consequences are dramatic, impacting all aspects of construction, deployment and operation and making underwater pumped hydro energy storage a realistic low cost alternative to all other forms of energy storage. Some important aspects of the present invention shall now be discussed:

The performance of the system in FIG. 3 shall depend on the interstitial void volume between the objects in the container, which should be stable and as large as possible, and also on the flow resistance for water percolating through the packed fill material, which should be as low as possible.

The void volume can be estimated for certain objects and 3D packing arrangements and from empirical data. As an example, if the objects are spheres of equal size packed in the most dense close packing arrangement, they shall occupy a volume fraction $\eta=0.740$, corresponding to a perfect crystal. This is a geometric property, independent of the sphere size. In this case, the volumetric fraction of the void volume is $1-\eta=0.26$. Other organized or random packing arrangements shall occupy lower volume fractions, down to a value of $\eta=0.494$ for diluted ("tunneled") face centered cubic arrangements, corresponding to a volumetric fraction of void volume $1-\eta=0.506$. In general, a mixture of spheres or other objects with non-identical sizes result in random packing arrangements and lower volume fractions. However, when the sizes differ much, the smaller objects pack inside the space between the larger objects, increasing the volume fraction $\eta$. This has a doubly detrimental effect relative to the present invention, causing the void volume $1-\eta$ to decrease and creating flow resistance for water passing through the void volume in the container.

As a general rule, the objects constituting the packing material in the container should be of uniform and fairly large size, and made from hard material. Crushed rocks and gravel are of interest in the present context. Solid granite has a density of 2.69 tons/m$^3$, which is reduced to 1.4-1.7 tons/m when in crushed and gravel form. This is adequate for weighing down the container in water and overcoming buoyancy of the system, and corresponds to a volumetric void volume fraction in the range $1-\eta=0.36-0.48$. Thus, compared with prior art hard shell container systems, containers as taught in the present invention must have a 50-60% larger volume to store the same amount of energy. Clearly, this is a low price to pay compared to the achieved benefits.

Figure 4A:
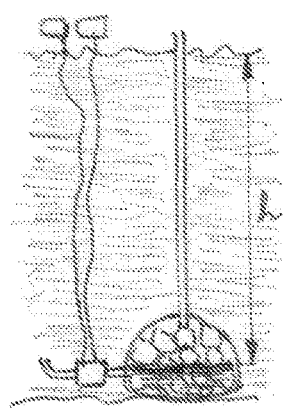
Figure 4B:
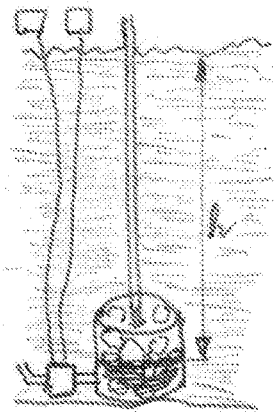
Figure 4C:
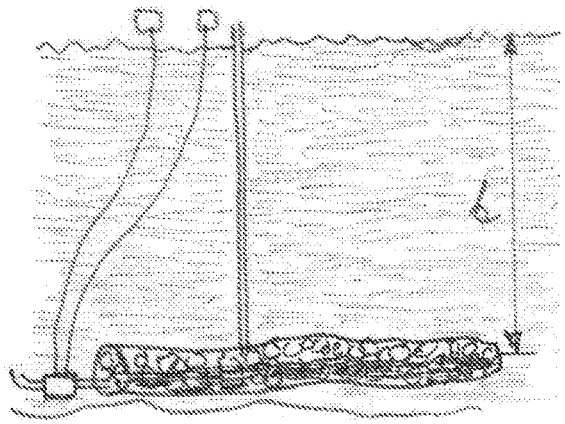
Figure 4D:
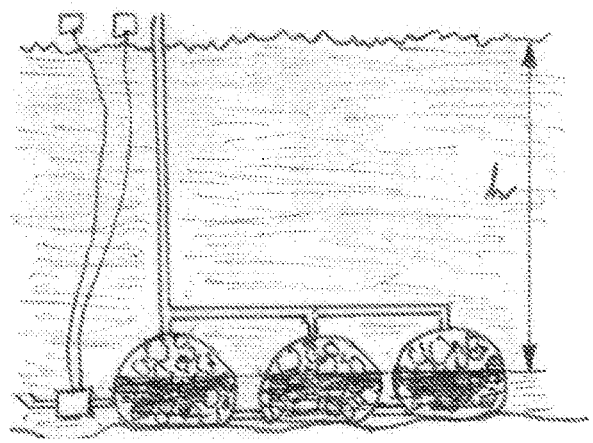
Figure 4E:
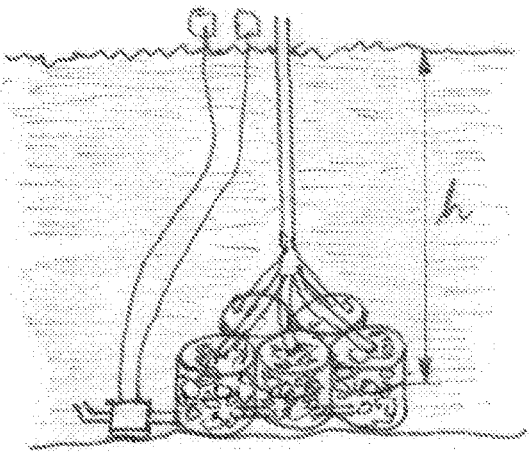
Figure 5B:
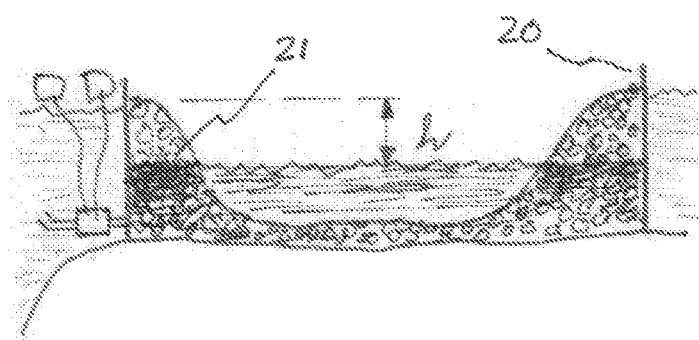

As referred above, containers according to the present invention may be constructed in virtually any size and shape, creating opportunities for novel configurations. Examples of some generic configurations are shown in FIGS. 4a-e, FIGS. 5a,b and FIGS. 6a,b: FIG. 4a illustrates the basic configuration of FIG. 3 where a sack-like container is submerged and rests on the sea bottom. In FIG. 4b, the container is a vertical cylinder. In FIG. 4c, the container is a cylinder or a serpentine sausage-like structure lying on the sea bottom. Multiple containers may be coupled as illustrated in FIGS. 4d, 4e, serviced by a single pump/generator unit and air vent. In variants of these configurations, the container may be tethered or supported in the water column above the bottom. FIGS. 5a,b illustrate a different type of configurations where the container is not completely immersed in water but has a free surface to the atmosphere. In FIG. 5a, the container is open on the top and extends above the water surface, and is surrounded by water on the sides and bottom. The container is filled with rocks or other objects (17) which support the enveloping walls (18) and floor (19) against the water pressure outside and greatly reduce requirements of stiffness and structural strength in the wall and floor construction. At the same time, the weight of the fill material provides stability and counteracts the buoyancy forces acting on the container. The configuration in FIG. 5b is similar to that shown in FIG. 5a. It is particularly suited for large scale energy storage in shallow waters, where reduced energy density due to lack of depth is compensated by large storage volume. A watertight wall (20) surrounds a volume, forming a coffer-dam like structure which constitutes the container. Supporting the wall from the inside is a mound of rocks or other filler material (21), which may be kept in place by nets or sacks which allow water and air to pass through. The rest of the space inside, which may represent a very large volume, is open. Thus, at a given state of charge/discharge, water in the container is partly located in the void space in the filler material and partly in the open space in the middle of the container. FIGS. 6a,b illustrate a particular construction belonging to a class of schemes where pre-existing structures are incorporated as part of the pumped hydro energy storage container: In this case the pre-existing structure is a steep mountainside plunging into the water. A watertight membrane forms a pocket (22) which extends from the mountainside into the water, constituting the pressure resistant container. Consistent with the present invention, it is filled with rocks or other objects to keep it from collapsing when water is pumped out during the charging cycle.

Figure 2:
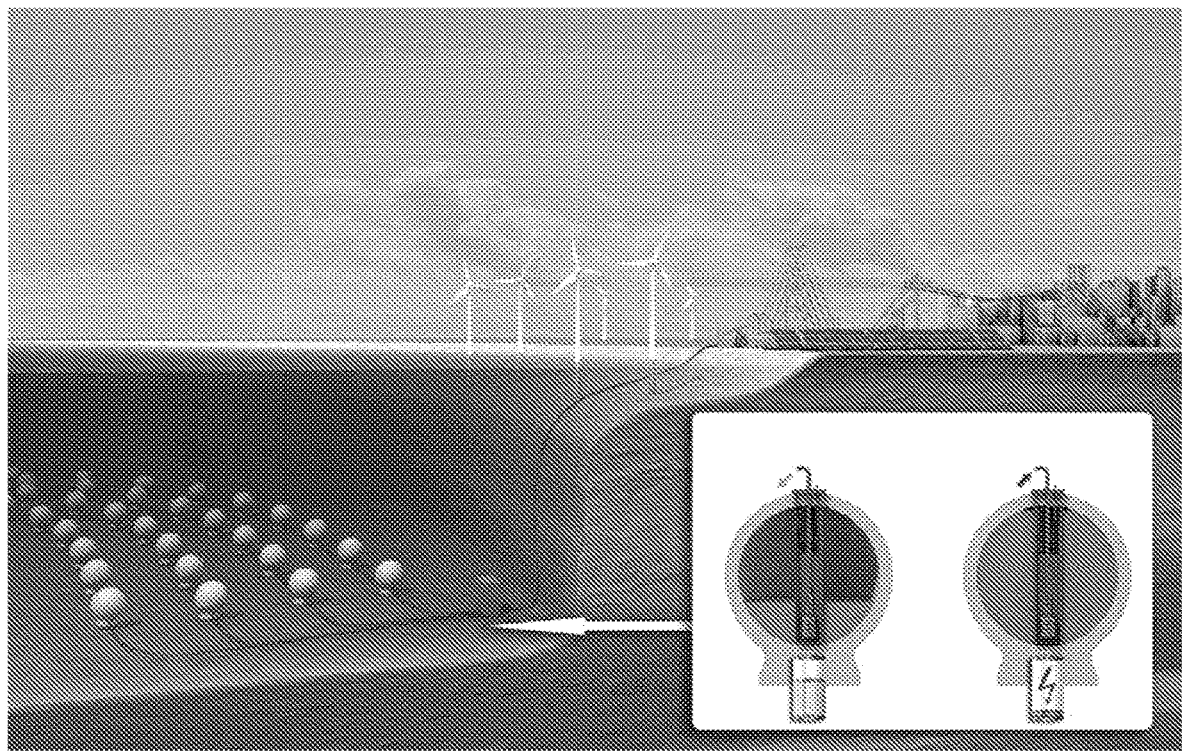
FIG. 2 shows an example of a prior art system in the planning stage.

FIG. 7 shows a system very similar to the one in FIG. 3, but without the air venting tube (4). This simplifies the system considerably, and has been shown to function in a small scale demonstration of a prior art system similar to the one illustrated in FIG. 2 (se, e.g.: http://forschung-energiespeicher.info/aktuelles/aktuelles-einzelansicht/2/Das_System_laesst_sich_flexibel_einsetzen-1/). However, removing the air venting tube and sealing the container with air inside shall reduce the amount of energy that can be stored. A rough estimate can be made as follows: Assume that one starts out from a fully charged state where the container is fully drained of water and has only air at a pressure of $p_1$ which fills the void volume $V_1$ between the objects in the container. Discharging the system involves admitting water from the outside (13) (at pressure $p_2$) into the container through the turbine (3), whereby the air in the void volume is displaced by the water. As the air gets compressed, it generates an increasing counterforce against the inrushing water, reducing the net power generated by the turbine. Ultimately the air is compressed into a small void volume $V_2$ at the top of the container at a pressure $p_2$ which balances the pressure outside the container, and the water stops flowing. In the isothermal and reversible approximation where all thermal effects of the compression have died out and the air and water inside the container have stabilized at the temperature of the surrounding water, one has:

$$V_2=p_1V_1/p_2 \qquad \text{Eq.2.}$$

and the energy spent on compressing the air can be approximated as:

$$W_{compressed\ air}=p_2V_2\ln(p_1/p_2)=p_1V_1\ln(p_1/p_2) \qquad \text{Eq.3.}$$

In the case shown in FIG. 3 where the air is vented, the energy that can be stored in the void volume $V_1$ can be expressed as:

$$W_{Water}=(p_2-p_1)V_1 \qquad \text{Eq.4.}$$

In the case shown in FIG. 6, the amount of water flowing into the container during discharge is:

$$V_{Reduced}=V_1-V_2=V_1(1-p_1/p_2) \qquad \text{Eq.5.}$$

And the potential energy of the water in the reduced void volume becomes:

$$W_{Water,reduced} = (p_2 - p_1) V_{Reduced} \quad \text{Eq.6.}$$

Combining the effects of a reduced water storage volume and compression loss of energy, the net energy which can be stored is:

$$W_{Net} = W_{Water,reduced} - W_{Compressed\ air} \quad \text{Eq.7.}$$

Some Numbers

Example 1: At depth ~700 m in water having a density 1000 [kg/m$^3$] and with $p_1$=1 [bar]=0.1 [MPa], $p_2$=71 [bar]=7.1 [MPa], $V_1$=1 [m], one has $V_2$=0.0141[m$^3$], $W_{Water,reduced}$=1.92 [kWh]. Inserting numbers into Eq.3, one obtains: $W_{Compressed\ air}$=0.117 [kWh]. Thus, sealing off the vent reduces the amount of water that can be exchanged during charging and discharging. In addition, some of the energy is diverted into compressing the air inside the container. In the numerical example above, the effect is to reduce the maximum energy that can be stored in each cycle from: $W_{Water}$=1.92 [kWh] per m3 void volume in the vented case, to: $W_{Net}$=$W_{Water,reduced}$−$W_{Compressed\ air}$=1.80 [kWh], i.e. a reduction of 6.3%.

Example 2: At depth ~50 m in water having a density 1000 [kg./m$^3$] and with $p_1$=1 [bar]=0.1 [MPa], $p_2$=6 [bar]=0.6 [MPa], $V_1$=1 [m$^3$], one has $V_2$=0.167[m$^3$], $W_{Water,reduced}$=0.116 [kWh]. Inserting numbers into Eq.3, one obtains: $W_{Compressed\ air}$=0.050 [kWh]. The maximum energy that can be stored in each cycle is then reduced from: $W_{Water}$=1.39 [kWh] per m$^3$ void volume to: $W_{Net}$= $W_{Water,reduced}$−$W_{Compressed\ air}$=0.066 [kWh], i.e. a reduction of 95%.

A possible remedy is to evacuate the air in the container partly or completely before starting energy storage operations. This can be done by pumping out the air with a vacuum pump connected to the air pocket inside the container or by opening a valve at the top of the container (cf. (23) in FIG. 7) while filling the container with water in a discharging mode. However, when the residual air pressure is lowered into the range 50 millibar and below, there is a risk of cold boiling at the relevant temperatures, and the attendant cooling may cause problems from ice formation, e.g. obstruction of flow and reduced effective void volume.

In conclusion, removing the air venting tube (4) and sealing the container with air at moderate pressure (e.g. 1 bar) inside shall have a minor effect on the energy storage capacity of systems at large depths, where the benefits of a simplified system with a sealed container are the largest. At shallow depths, the energy storage capacity is strongly reduced in systems with a sealed container, but this may be remedied by reducing the air pressure in the container prior to starting charging and discharging operations, observing the possible problems due to cold boiling, cf. above. At shallow depths, however, the technical challenges of providing a venting connection to the surface are relatively insignificant.

FIG. 8 shows an example where a container (15) according to the present invention is used to store energy in the form of compressed air: Charging takes place by activating the motor (24) driving the compressor (25). The control unit (26) directs compressed air into the container (14) via the tube (4), forcing water out of the container via a tube (29) and emptying it in the surrounding body of water (30).

Contrary to prior art cases where compressed air is stored in expanding balloons tethered on the sea bottom (cf., e.g.: Maxim de Jong: "Commercial Grid Scaling of Energy Bags for Underwater Compressed Air Energy Storage"; www.thin-red-line.com/140714_ThinRedline_OSES2014.pdf) the present system is isometric: The only energy absorbing moving entity interacting with the compressed air is the water surface (11) inside the container. With all parts of the container located at essentially the same depth as the point where water in the container is exchanged with the surrounding water (30), the only part of the underwater system experiencing strong unbalanced forces from the compressed air is the tube (4). When energy is released from the system, the control unit (26) is connected with the expander (28), which drives the generator (27). The person skilled in the art shall recognize the essentially new aspects of this system compared to prior art, and understand the simplifications that have been made in the present description, in particular relating to management of the thermal energy generated in the compression process (cf. literature on CAES (Compressed Air Energy Storage)). All moving machinery is located above water, and the underwater installations are not subjected to large unbalanced stresses, excepting the tube (4) which is easily designed with the required strength. Compared to prior art systems, the present installation has no net buoyancy and thus avoids ballasting and tethering which typically may involve thousands of tons of restraining force.

Some Important Issues:

Water which flows through the filler material during charging and discharging should encounter as low flow resistance as possible, to maximize the round trip efficiency of the energy storage process and allow high peak power delivery. As shown in the principle drawing in FIG. 3, there is a transfer tube (2) transporting water in and out of the container. Depending on circumstances, the transfer tube may be terminated inside the container in a branched manifold with several tubes distributed throughout the container volume, or several transfer tubes entering the container may be used. At each point where a transfer tube debouches inside the container, a filtering device may be fitted to avoid clogging from debris and small particle fractions in the filler material.

The membrane forming the container wall shall typically be exposed to strong, cyclic stress during charging/discharging: When water is evacuated from the container, the hydrostatic pressure from the surrounding body of water forces the membrane against the filler material. If there are large exposed cracks/cavities between the filler material particles contacting the membrane, the membrane will be pushed into the cracks/cavities and may experience high local stress loads. This problem is similar to that which has been encountered and successfully resolved in connection with the use of geotextiles to contain rocks and gravel in constructions such as land fill, roads and dams, and very strong geotextiles have been designed and successfully implemented in these cases, including watertight variants. Another strategy is to localize a cushion layer as a liner on the inside of the container wall, e.g. in the form of sand or small grained particles distributed in pouches, or by filling the container with a heterogenous size distribution of filler material with a coarse fraction at the center and a finer fraction facing the container walls. In general, many types of composite and layered membranes are possible, e.g. an inner mesh or fabric with high tear strength, surrounded by a cushion layer, with a watertight membrane on the outside.

FIG. 9 shows a preferred embodiment of a container according to the present invention which combines robustness against mechanical wear and tear with modularity and easy handling: The container has a prismatic shape defined by a stiff structural frame (31). Inside the frame and mechanically attached to it is a membrane (32) which forms a closed internal container tightly packed with incompressible objects. The membrane is flexible, allowing it to move into supporting contact with the packed objects in the internal container when subjected to compressive forces from the surrounding body of water. In the example shown in FIG. 9, the internal container is formed by sheet metal which may be corrugated (not shown) to promote compliance with the surface topography of the packed material inside. The overall shape provides opportunities for stacking of several containers in three dimensions, to achieve scalability of the total energy that can be stored at a given location. As can be seen, there are close analogies to container systems widely employed in transporting goods worldwide, and embodiments of the present invention may employ standard transport containers that are modified for the purpose.

Figure 10A:
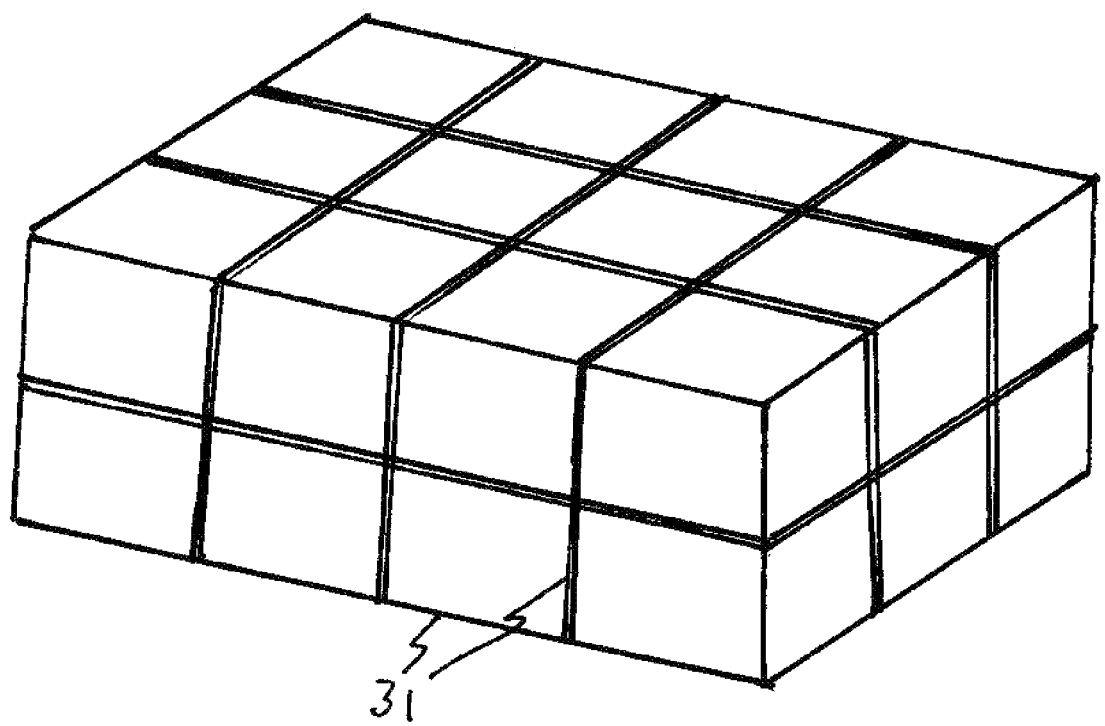
Figure 10B:
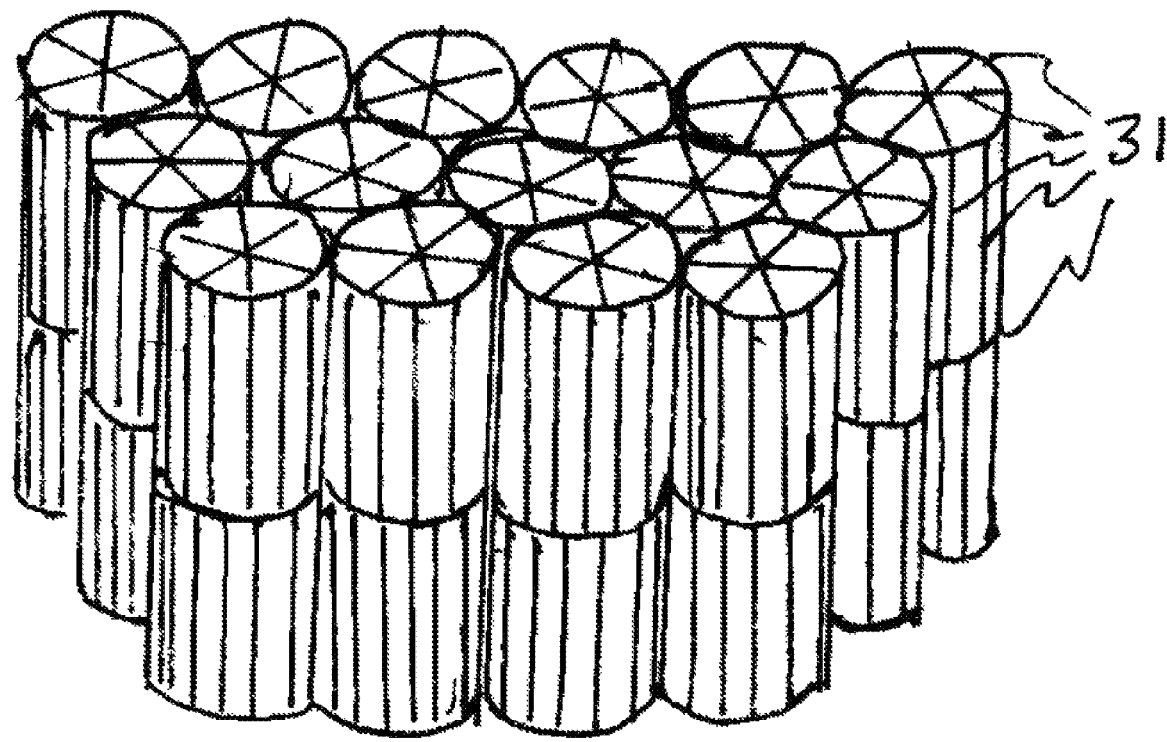

FIGS. 10a,b show in a schematic fashion how modular containers can be stacked to provide scalable energy storage, employing stiff structural frames (31) which support closed internal containers with flexible membranes tightly packed with incompressible objects (not shown). In FIG. 10a the containers are prismatic in analogy with the container shown in FIG. 9, whereas the containers in FIG. 10b are cylindrical, arranged in a close packed geometry.

The invention claimed is:

1. An underwater energy storage system comprising:
a container configured to be arranged in a body of water with a water surface, the container having a container volume comprising a void container volume configured to be filled with gas and water to varying degrees at an internal pressure lower than an external pressure of the body of water surrounding the container,
a pumping arrangement for pumping water from the void container volume into the body of water for storing energy, and a device for allowing water from the body of water flowing via a turbine into the void container volume for generating energy,
wherein:
the container comprises a water- and gas-tight membrane defining the container volume, and
incompressible objects are densely packed throughout the container volume limiting deformation of the membrane by the external pressure, and
the void container volume is formed by a communicating void interstitial volume between the incompressible objects.

2. The underwater energy storage system according to claim 1, wherein the incompressible objects comprise one or more of the following: gravel, rocks, shaped objects of concrete, polymer, composites or metal.

3. The underwater energy storage system according to claim 2, wherein the incompressible objects have mainly spherical shapes with diameters that differ by less than a factor of 4:1.

4. The underwater energy storage system according to claim 1, wherein a net buoyancy of the energy storage system is negative.

5. The underwater energy storage system according to claim 1, wherein the membrane comprises at least one of the following materials: a geotextile; a metal net; one of, a polymer net or mesh; one of, a metal or polymer sheet; and one of, a metal or polymer foil.

6. The underwater energy storage system according to claim 5, wherein the membrane comprises a single layer of the at least one material.

7. The underwater energy storage system according to claim 5, wherein the membrane comprises multiple layers of the at least one material.

8. The underwater energy storage system according to claim 1, wherein the container has an external shape selected among the following: sack, sphere, cylinder, and prism.

9. The underwater energy storage system according to claim 1, wherein the container comprises a stiff frame carrying a rest of the container, and the membrane has flexibility to transmit external hydrostatic pressure to the incompressible objects.

10. The underwater energy storage system according to claim 9, wherein the stiff frame is one of, prismatic or cylindrical.

11. The underwater energy storage system according to claim 9, wherein the system comprises at least two containers with stiff frames, and the at least two containers are arranged in direct contact.

12. The underwater energy storage system according to claim 1, wherein the container comprises an outtake in a lower part, and the pumping arrangement comprises a pump arranged for pumping water out of the void container volume via the outtake, for storing energy.

13. The underwater energy storage system according to claim 1, wherein the system comprises the turbine which is arranged for driving an electrical generator, and which is arranged at mainly the same depth as the container, and generating electrical energy by allowing water to enter the void container volume through the turbine.

14. The underwater energy storage system according to claim 1, comprising a gas transport tube communicating between an upper part of the void container volume and devices for introducing compressed gas into the void container volume and for extracting energy from compressed gas in the void container volume, and further comprising an opening in the lower part of the void container volume providing open access into a body of water surrounding the container.

15. The underwater energy storage system according to claim 14, wherein the system further comprises a valve controlling flow of water between the lower part of the void container volume and the body of water surrounding the container.

16. The underwater energy storage system according to claim 1, wherein the upper part of the container comprises a communicating tube between the void container volume and air above the body of water.

17. The underwater energy storage system according to claim 1, wherein an upper part of the void container volume is configured to be sealed such that gas in the void container volume is sealed inside.

18. The underwater energy storage system according to claim 17, wherein the container is sealed, and gas in the void container volume is evacuated to a pressure below 200 millibar with water either absent or at a level in the void container volume near that corresponding to a maximum of energy stored.

19. The underwater energy storage system according to claim 1, wherein the gas in the void container volume is air.

20. The underwater energy storage system according to claim 1, wherein the container is arranged in at least one of the following ways:

i) completely submerged in the body of water;
ii) extending from the water surface open to the air above, and down to a sea floor;
iii) extending from the water surface open to air above, and into the body of water where the air- and watertight membrane form sidewalls and bottom; and
iv) extending from a permanent structure, such that at least parts of the container are formed by a part of the permanent structure.

21. An underwater energy storage system comprising:
a plurality of containers configured to be arranged in a body of water with a water surface, the containers having a container volume comprising a void container volume configured to be filled with gas and water to varying degrees at an internal pressure lower than an external pressure of the body of water surrounding the containers,
a pumping arrangement for pumping water from the void container volume into the body of water for storing energy, and a device for allowing water from the body of water flowing via a turbine into the void container volume for generating energy, wherein:
the containers comprise a water- and gas-tight membrane defining the container volume,
incompressible objects are densely packed throughout the container volume limiting deformation of the membrane by the external pressure,
the void container volume is formed by a communicating void interstitial volume between the incompressible objects,
the containers comprise an outtake in a lower part, and the pumping arrangement comprises a pump arranged for pumping water out of the void container volume via the outtake, for storing energy, and
wherein the containers are serviced by at least one of the same pump and turbine via a network of tubes.

* * * * *